L. S. SKELTON.
GLASS DRAWING APPARATUS.
APPLICATION FILED JAN. 4, 1916.
1,243,564.
Patented Oct. 16, 1917.
2 SHEETS—SHEET 2.
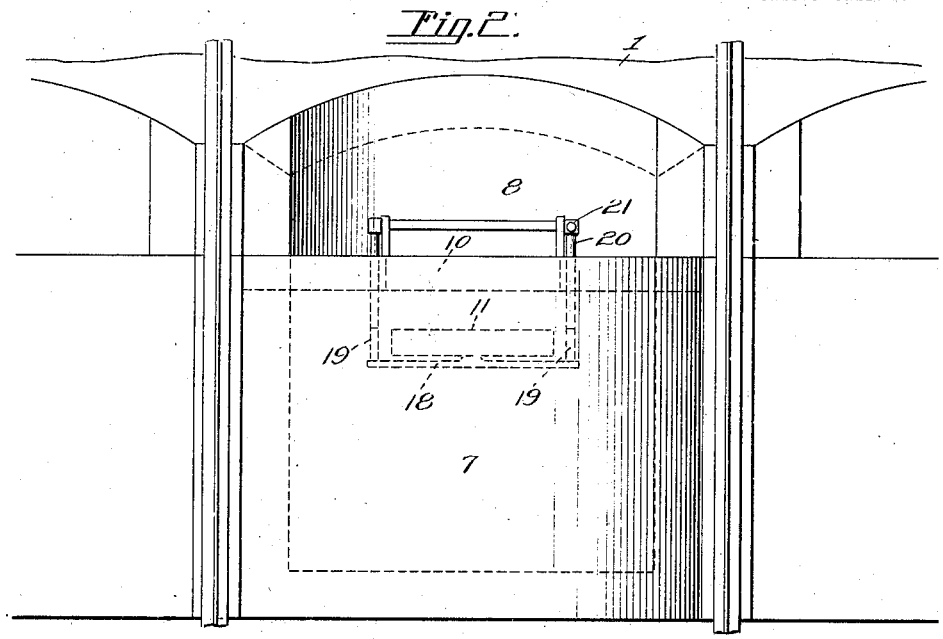
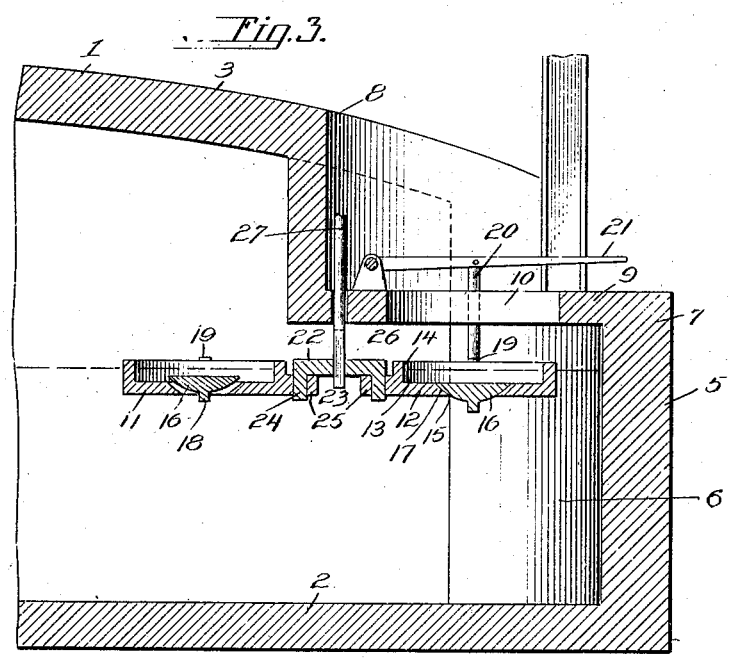
Witnesses
F. L. Gilson.
Inventor
L. S. Shelton.
By Victor J. Evans
Attorney L. S. SKELTON.
GLASS DRAWING APPARATUS.
APPLICATION FILED JAN. 4, 1916.
1,243,564.
Patented Oct. 16, 1917.
4 SHEETS—SHEET 3.
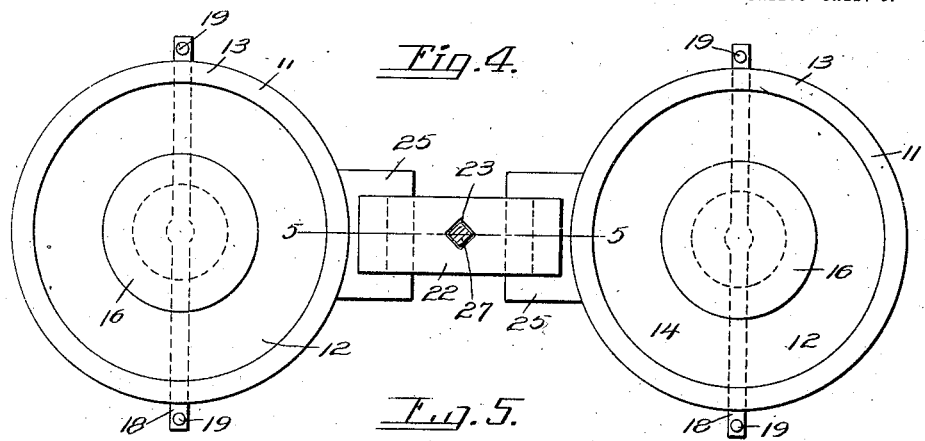
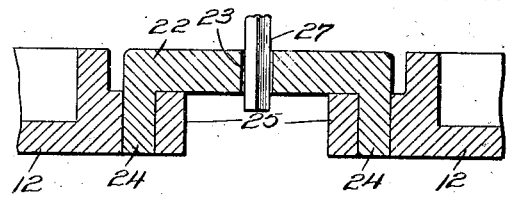
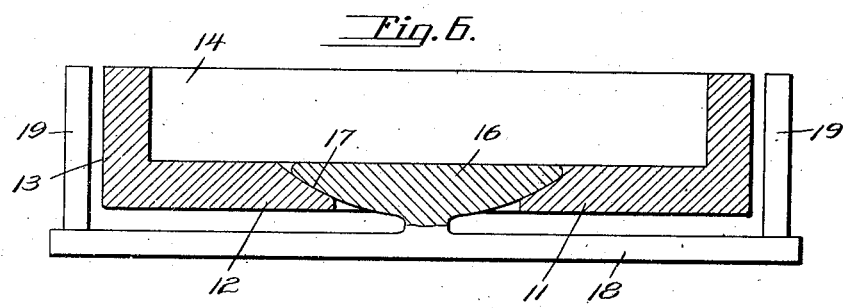
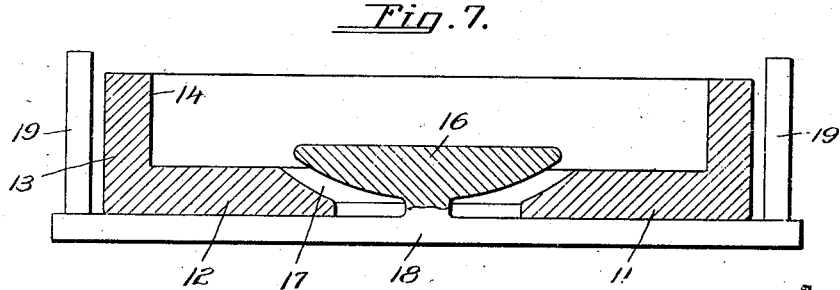
Inventor
L. S. Skelton.
Witnesses
F. C. Gilson.
A. A. Hines.
By Victor J. Evans
Attorney

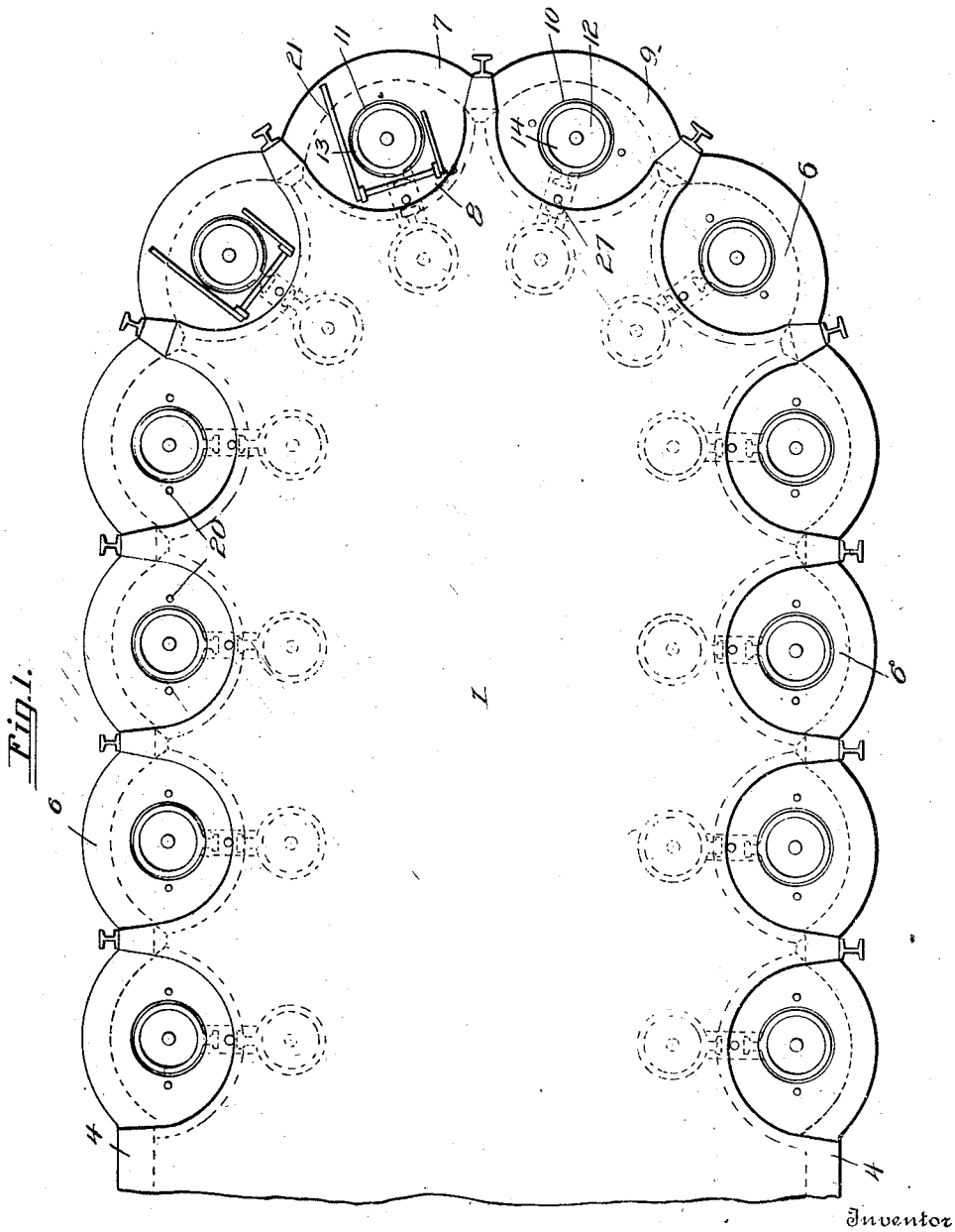

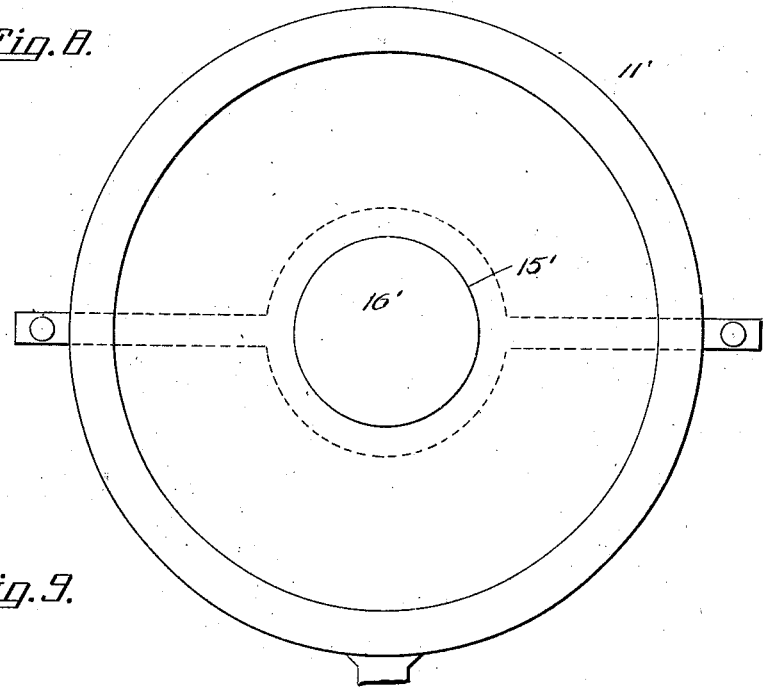
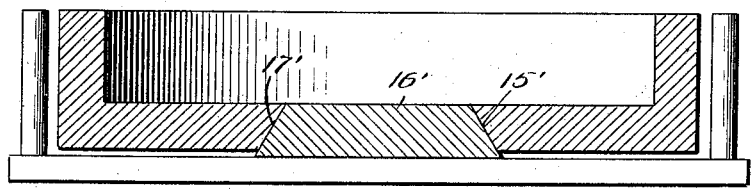
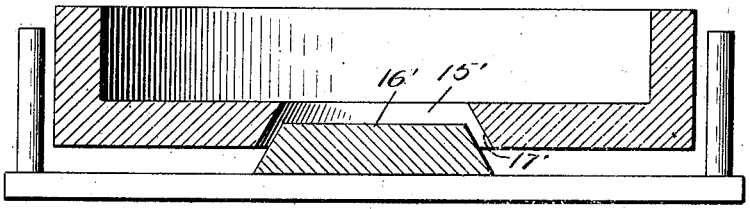

UNITED STATES PATENT OFFICE.

L SHERMAN SKELTON, OF OKMULGEE, OKLAHOMA.

GLASS-DRAWING APPARATUS.

1,243,564.　　　　Specification of Letters Patent.　　Patented Oct. 16, 1917.

Application filed January 4, 1916. Serial No. 70,141.

*To all whom it may concern:*

Be it known that I, L SHERMAN SKELTON, a citizen of the United States, residing at Okmulgee, in the county of Okmulgee and State of Oklahoma, have invented new and useful Improvements in Glass-Drawing Apparatus, of which the following is a specification.

My invention relates generally to glass drawing apparatus of that kind designed for drawing hollow glass cylinders for the production of window glass and the like, and particularly to an improved construction of glass furnace and glass pots for coöperation therewith to enable charges of glass to be taken from the body of molten glass within the furnace chamber and presented at the drawing openings for the action of the drawing tool.

One object of the invention is to provide a glass furnace wherein the drawing openings are arranged continuously about the sides and nose or front of the furnace and are unobstructedly in communication with each other and the main portion of the furnace chamber, by means of which a circulation of the glass within the furnace chamber will be established to prevent the accumulation of cold glass or impurities at the front of the furnace as well as the drift of particles of cold glass or impurities from one drawing station or opening to another during the successive glass drawing operations, whereby the accumulation of an undesirable amount of chilled glass or impurities around the drawing openings will be avoided and the body of glass within the furnace chamber kept in a more uniformly heated condition.

A further object of the invention is to provide a glass furnace wherein the drawing openings are arranged partially within and partially without the line of the outer wall of the furnace chamber, and wherein the glass pots or receptacles are arranged so as to be moved between the forehearth and furnace chamber into and out of registry with the drawing openings so as to tend to sweep the cold glass and impurities from the drawing stations back into the main body of glass, thus making further provision to assist in keeping the glass in and about the drawing openings in a substantially pure condition.

A still further object of the invention is to provide novel means for connecting and mounting for rotation a plurality of glass pots or receptacles for coöperation with each drawing opening, whereby the aforesaid objects may be accomplished in a simple, reliable and efficient manner, and whereby successive charges of glass may be quickly presented for the successive drawing actions and the parts combined and arranged so that the pots may be easily assembled and a defective pot removed at any time and another installed with facility in its place.

A still further object of the invention is to provide a glass pot or receptacle having an opening in its bottom through which it may be filled with a charge of glass from below the surface of the body of molten glass, together with means for closing the opening to segregate the entered charge of glass from the body of glass in the furnace and interpose an insulating wall between the same, by means of which a charge of glass free from impurities may be taken up while the body of glass below the drawing opening within the furnace chamber will be protected during the drawing action from cooling drafts of air and thus prevented from chilling, so that the glass within and about the forehearth may be kept in a more uniformly heated and better condition for the production of cylinders free from lines, blisters and other defects and of greater length and more uniform degree of thickness than is possible with other types of glass drawing apparatus.

A still further object of the invention is to provide novel means for controlling the glass pots to effect the opening and closing of the valves or means for controlling the openings in the bottoms thereof.

With these and other objects in view, the invention consists of the features of construction, combination and arrangement of parts hereinafter fully described and claimed, reference being had to the accompanying drawings in which:—

Figure 1 is a top plan view of the major portion of a glass drawing apparatus embodying my invention, and showing particularly the construction of the furnace.

Fig. 2 is a view in elevation of a portion of the furnace on an enlarged scale and looking toward one of the drawing openings or stations.

Fig. 3 is a vertical longitudinal section taken axially through one of the drawing openings.

Fig. 4 is a top plan view on an enlarged scale of one of the rotary carriers and a pair of glass pots connected therewith.

Fig. 5 is a detail section on the line 5—5 of Fig. 4.

Fig. 6 is a vertical section through one of the glass pots shown in Figs. 4 and 5 with the valve in normal position.

Fig. 7 is a similar view showing the pot depressed for the filling or charging action.

Fig. 8 is a top plan view of a slightly modified construction of pot.

Figs. 9 and 10 are views similar to Figs. 6 and 7 of the pot shown in Fig. 8.

Referring to the drawings, 1 designates a glass kiln or melting furnace provided with any suitable type of heating means and which includes generally a bottom wall 2, top wall 3, side walls 4 and a front wall or nose portion 5. The furnace is constructed as usual in the main of fire brick or fire clay, braced or reinforced in the usual or any suitable manner, and said furnace is provided with a series of forehearths or drawing chambers 6. These chambers extend along the sides and also along the nose or front of the furnace and are arranged partially within and partially without the line of the side and front walls of the furnace, so that the body of molten glass within each forehearth or drawing chamber will be closer to the main body of glass within the main furnace chamber from which said forehearths are supplied, whereby the supply of molten glass as a whole will be kept at a more uniform temperature with obvious advantages. As shown, each forehearth or drawing chamber comprises a segmental or arcuately curved breast wall 7 a similarly and reversely curved upper rear wall 8, and a top or crown wall 9 in which the drawing opening 10 is formed. This opening thus lies partially within the main furnace body so that the drawing tool and elements of the drawing mechanism proper, and the charge of glass from which the cylinder is being drawn, will be subjected to a higher degree of temperature than in the use of an ordinary full doghouse construction to reduce liability of chilling to a maximum degree, while at the same time protecting the main body of glass to a greater extent from the chilling effects of the outer atmosphere than would be possible in the arrangement of the drawing openings entirely within the line or confines of the body of the furnace. The interior of the main furnace chamber containing the main body of molten glass is preferably devoid of supports or other obstructions and the forehearths are in unobstructed communication therewith, to permit of a desired circulation of the glass and secure the elimination of all abutments or surfaces about which the glass may lodge in masses and become chilled, in order that the body of glass as a whole may be kept at a more uniform and higher degree of temperature throughout to keep the glass in a purer state and higher degree of fluidity.

For the purpose of presenting segregated charges of glass at each drawing opening, I provide a glass pot 11 of novel construction. This pot 11 is constructed of fire clay or other suitable material and is preferably of circular form and comprises a bottom wall 12 and upright wall 13 forming a chamber 14 of a size or capacity to receive a sufficient amount of glass for a complete charge. This pot is of somewhat less specific gravity than the body of glass so as to normally float upon the surface of the glass and is provided in its bottom with a filling opening or inlet 15 adapted to be closed by a float valve 16 disposed within the chamber 14 and movable downward against a seat 17 surrounding the filling opening, the valve lying when in closed position flush with the upper surface of the bottom wall 12. The valve is connected at its under side with a bar 18 extending diametrically across the pot and beyond opposite sides thereof and provided at its ends with upright arms 19. These arms 19 are adapted, when the pot is disposed in operative position beneath the opening 10, to aline and contact with vertically movable plunger rods or stems 20 movable through guide openings in the wall 9 and operatively connected with a lever or other suitable controlling device 21 by means of which the plunger rods are normally held elevated but may be manually moved downward to depress the valve 16 and hold it depressed and in closed position.

It will be understood from the foregoing description that the valve 16, which may be of slightly less specific gravity than the pot, is normally open and floats upward to the extent allowed by contact of the bar 18 with the underside of the bottom 12 of the pot, so that the pot is normally in communication with the body of glass through the opening 17 which will fill the pot up to the indicated level, the glass being taken from beneath the surface of the main body of glass so that the introduction of a charge substantially pure and free from hard particles is insured. When the drawing tool is brought into position to make the draw, the lever 21 is operated to depress the bar 18, by means of which the valve 16 will be closed thus cutting off communication between the body of molten glass and the interior of the pot. The charge of glass contained within the pot will thereupon be segregated from the main body of glass and from all the surface impurities thereon, including chilled particles, insuring the production of a more perfect cylinder, while at the same time the portion of the body of the glass underlying the opening 10 will be insulated by the closed pot from the outer atmosphere and kept from becoming chilled during the drawing action. As a result the portion of molten glass contained within each forehearth or drawing chamber will be kept at a higher temperature than would be otherwise possible, with less existing impurities, and owing to this fact and to the drawing of a pure charge of glass of a more than ordinary high temperature within the pot a cylinder of more uniform diameter and thickness and of greater length and with less defects than usual may be drawn, with less waste and consequently less cost of production for a better grade of article.

In practice, I preferably provide a plurality of pots for use in conjunction with each drawing opening and mount two or more of the pots upon a rotary support so that the same may be successively brought into operative position. In the present instance two pots of the construction described are shown in connection with a support, the said support comprising a head or coupling member 22 provided with an angular receiving opening 23 and having downturned portions or hooks 24 for engagement with apertured lugs 25 upon the pots whereby the pots are connected for conjoint movement and yet may be readily disconnected so that in the event of the disintegration of or injury to a pot it may be removed and another conveniently substituted therefor. The opening 23 is adapted to be engaged by the angular lower end of a vertical rod or shaft 27 extending upwardly through and journaled in a bearing opening in the wall 9 and forming an axis for rotating the pots to bring one pot in position beneath the drawing opening 10 while the other pot is disposed within the body of the furnace chamber. Suitable means may be employed for rotating the rod or shaft for the purpose described, and it will be evident that after one pot has been employed to contain a charge from which a cylinder is drawn the device may be rotated to bring the other pot into drawing position and to swing the used pot back into the furnace chamber so that any aftermath or residue of glass left remaining therein will be melted. When the used pot is swung to a retracted position and the valve 16 is no longer held depressed by the depressing device, it will be obvious that the valve will float up to an open position and thus allow the residue to melt and the pot to automatically refill with a fresh and pure charge of glass ready for the succeeding draw. By this means each pot will be kept free of impurities and may be shifted into and out of filling and drawing positions in a ready and convenient manner. Of course it will be understood that two, three, four or more pots may be mounted upon a single rotary head as may be desired in service.

In the form of pot above described the valve is arranged internally of the pot and moves downwardly for a closing action, but it is evident that modifications in the construction, arrangement and mode of operation of the valve for controlling the filling inlet may be made, so long as the principle of operation is preserved. In Figs. 8, 9 and 10 I have shown a pot 11' which is similar in construction to the pot 11 except that a filling opening 15' is provided which has a seat surface 17' which flares in a downward instead of an upward direction and which is adapted to be closed by a frusto conical or tapered valve 16'. This valve is arranged externally instead of internally of the pot and moves upwardly on a closing action, the valve normally floating upwardly to closed position. It will thus be evident that in the use of this pot the controlling device will be employed to force the valve downwardly for the admission of a charge of glass to the pot just prior to the drawing action, the aftermath or residue being melted within the pot when it is swung back into the furnace chamber or into a retracted position. In both structures, however, it will be noted that during the drawing action the pot will be closed to segregate the charge of glass therein from the body of glass in the furnace and to also insulate the body of glass in the drawing chamber below the drawing opening from the cooling effects of the outer atmosphere, whereby the advantages sought are gained in a positive and reliable manner.

The tendency of the body of glass in the furnace chamber is to move forwardly to keep the supply replenished as it is used, and under this tendency of the forward movement of the glass the crusts and impurities are liable to concentrate about interior obstructions or against the interior surface of the front wall or nose, and the crusts and impurities from each rear forehearth tend to circulate toward the forehearths in advance thereof and to contaminate the surrounding body of glass. In my improved construction of furnace these objections are avoided, as there are no interior obstructions against which the crusts and impurities may lodge and collect in a mass, and any tendency of the hard or impure glass to collect at the front of the furnace is overcome by the arrangement of the drawing openings at such portion of the furnace and their function in keeping the glass in motion. Furthermore, the arrangement of the drawing openings at the sides and front of the furnace is such that the drift of crusts and impurities from each is in a direction outwardly and away from the next succeeding drawing opening or at an angle toward the front and center of the mass of glass. By this means each forward or succeeding forehearth is kept to a large extent clear of the denatured and impure glass from the preceding forehearth, and this operation is promoted by the clearing motion of the rotary pots acting as sweeps or propellers. Inasmuch as the hard and impure glass is thus kept toward the center of the body of molten glass in the furnace chamber it will be evident that the glass as a whole will be kept in a higher liquid and purified state, with a consequent greater degree of purity of the glass in and about the forehearths and the resulting production of cylinders of materially better grade.

I claim:—

1. In a glass drawing apparatus, a pot adapted to float upon the surface of the glass and having a restricted filling opening in its bottom, a bar extending diametrically beneath the bottom of the pot, a controlling valve carried by said bar and movable within said restricted opening, and means operable for shifting the bar to move the valve from a normal to an abnormal position.

2. In a glass drawing apparatus, a coupling member, a plurality of pots connected with said coupling member for vertical movement with respect thereto, said pots being adapted to float upon the surface of the glass and each having a filling opening in the bottom thereof, means for rotating the coupling head, valves for closing the filling openings in the several pots, valve carrying means having upwardly extending contact means, and vertically movable contact bars adapted for engagement with the contact means pertaining to the valve of any pot carried in alinement therewith by the rotary movement of the coupling member.

3. A glass furnace having a glass drawing chamber including a curved breast wall extending outwardly beyond the line of the furnace wall, a curved upper rear wall extending inwardly beyond the line of the furnace wall, and a crown wall extending horizontally between the first named walls and provided with a drawing opening, a shaft supported for rotation in the crown wall between the rear wall and the drawing opening, a coupling member carried by said shaft, a plurality of pots carried by said coupling member and connected therewith for free vertical movement, each pot having a filling opening in the bottom thereof and a float valve to obstruct such opening, valve carrying bars extending diametrically beneath the several pots and having upwardly extending contact means, and vertically movable contact bars extending through the crown wall and adapted for engagement with the contact means pertaining to the valve of the pot that is temporarily disposed beneath the drawing opening.

In testimony whereof I affix my signature in presence of two witnesses.

L SHERMAN SKELTON.

Witnesses:
W. P. HUSKIN,
J. A. PRICE.